United States Patent [19]
Gardner et al.

[11] 3,995,598
[45] Dec. 7, 1976

[54] SAFETY COLLAR

[76] Inventors: Elston A. Gardner, 23920 Anza Ave., No. 127, Torrance, Calif. 90505; Janie G. Connors; John C. Connors, both of 26833 Westvale, Palos Verdes Peninsula, Calif. 90274

[22] Filed: Jan. 15, 1975

[21] Appl. No.: 541,290

[52] U.S. Cl. .................. 119/106; 59/93; 119/110
[51] Int. Cl.² .................. A01K 27/00; F16G 15/00
[58] Field of Search ............ 119/96, 106, 107, 109, 119/110; 73/88, 143, 95, 158, 88, 95; 54/21, 68; 24/73 D; 220/89 R, 89 A; 59/78, 93 XR, DIG. 1, 78; 188/241; 70/422; 64/28, 30 D, 28 R; 116/DIG. 34; 294/74

[56] References Cited
UNITED STATES PATENTS

| | | | |
|---|---|---|---|
| 2,616,394 | 11/1952 | Elsinger | 119/106 |
| 3,011,478 | 12/1961 | Kirby | 119/106 |
| 3,349,531 | 10/1967 | Watson | 403/2 |
| 3,605,384 | 9/1971 | Pacini | 119/96 |
| 3,779,004 | 12/1973 | Gloeckler | 59/93 |

*Primary Examiner*—Robert Peshock
*Assistant Examiner*—Peter K. Skiff
*Attorney, Agent, or Firm*—John Holtrichter, Jr.

[57] ABSTRACT

A self-releasing collar for safely restraining an animal on a tether, the collar including a neck-encircling flexible neck member with a first closed ring attached at one end and with one end of a breakable link attached to the other end of the neck member, this end of the neck member being extendable through the first closed ring, the tether being attachable to the other end of the breakable link so that the tether is released from the neck member if the tension in the breakable link exceeds a predetermined magnitude to rupture the link.

8 Claims, 5 Drawing Figures

000
SAFETY COLLAR

BACKGROUND OF THE INVENTION:

The background of the invention will be set forth in two parts.

1. Field of the Invention

This invention relates to a safety collar and more particularly to a flexible collar incorporating a breakable safety member that automatically releases the collar from about an animal's neck.

2. Description of the Prior Art

Over the years, there has been considerable activity by those interested in the safety and well being of domestic animals in providing a tether that would allow an animal to be left unattended for a period of time while restricted by the tether, and which would include a release mechanism should, for any reason, the pull on the collar become great enough to cause injury to the animal.

In many of the schemes that have been developed, a plug or ball is held in a socket until a predetermined tension force is exerted on the release mechanism to cause the plug to leave the socket. In some cases, the plug includes a resilient member that compresses to escape from the socket, while in other cases the socket includes a resilient portion that expands under sufficient force to release the plug. In a few instances, the socket is provided with adjustment means whereby the mechanism will release when a force of a predetermined magnitude is applied thereto.

It has been found that many plug or ball-in-socket mechanisms are not reliable in that some release when they shouldn't and others do not release when they should. Also, it has been found that because of its simplicity and accessibility, the release mechanism is often used to attach a collar to and detach the collar from an animal instead of unbuckling or otherwise removing the collar. This tends to cause wear or a permanent set in the resilient portion of the release mechanism which degrades its reliability. On the other hand, the more complicated adjustable mechanisms are costly to manufacture.

SUMMARY OF THE INVENTION:

In view of the foregoing factors and conditions characteristic of the prior art, it is a primary object of the present invention to provide a new and improved safety collar for animals.

Another object of the present invention is to provide a simple yet reliable safety collar that does not change its safety release characteristic due to age, use, temperature or humidity.

Still another object of the present invention is to provide a safety collar for animals that includes a release mechanism that may easily be defeated, without damaging the mechanism or altering its release characteristic for future use.

Yet another object of the present invention is to provide a safety collar with a breakaway link that is easily replaced, when desired, by a similar link having the same or another known release characteristic.

Still a further object of the present invention is to provide a safety release mechanism that is adaptable for use with any flexible neck member and for releasably tethering any animal, such as dogs, cats, horses, goats, and the like.

In accordance with one embodiment of the present invention, a safety collar is provided for attachment about an animal's neck, the collar including a flexible neck member having first and second end portions with a first closed ring attached to the first end portion, the second end portion being adapted to extend through the first closed ring. The invention also includes a second closed ring and breakaway means having a pair of relatively small diameter closed ring portions coupled together at a point in their respective outer peripheral surfaces by a breakable connecting post portion, the breakaway means being attached between the second end portion and the second closed ring by the respective ring portions for releasing the second closed ring from the flexible neck member when tension in the breakable connecting post portion exceeding a predetermined magnitude ruptures said post portion.

The features of the present invention which are believed to be novel are set forth with particularity in the appended claims. The present invention, both as to its organization and manner of operations, together with further objects and advantages thereof, may best be understood by making reference to the following description taken in conjunction with the accompanying drawing in which like reference characters refer to like elements in the several views.

Figure 1:
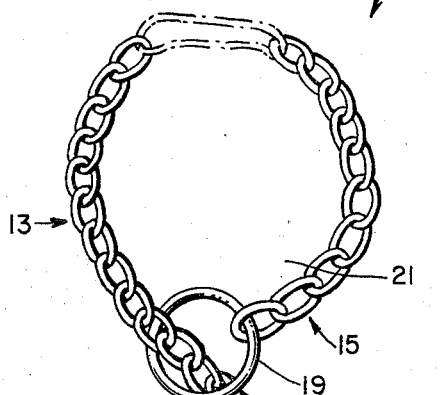
FIG. 1 is a perspective view of a safety collar for animals constructed in accordance with one embodiment of the present invention.

DESCRIPTION OF THE PREFERRED EMBODIMENTS:

Referring now to the drawing and more particularly to FIG. 1, there is shown a safety-tether embodiment of the present invention wherein a safety collar 11 is provided for attachment about an animal's neck, the safety collar including a flexible neck member such as a chain 13 having a first end portion generally designated 15 and a second end portion 17, there being attached to the first end portion 15 a first closed ring 19, and the second end portion 17 being adapted to extend through the first closed ring 19 and to thus form a loop 21 to accommodate the neck of an animal (not shown).

The invention also includes a special breakaway element 23 having first and second closed ring portions 25 and 27, respectively, integrally connected together at points in their respective outer peripheral surfaces 29 and 31 by a breakable connecting post portion 33. The first closed ring portion 25 may be attached to the second end portion 17 of the neck member 13 by a closed ring 35, and a conventional release clip 37 of a tether 39 may be clipped to a closed ring 41 that is attached to the ring portion 27, as shown in FIG. 1. The ring 41 has an outer diameter as great or greater than the inner diameter of the ring 19 so that it cannot pass therethrough.

In order to facilitate attachment and possible replacement of the breakaway element 23, the closed ring 35 and the closed ring 41 may be of the split-ring or tight helical coil type, the ring 35 having an outer diameter less than the inner diameter of the closed ring 19 to pass easily through ring 19.

The breakaway element 23, shown in FIG. 1, may be of a ceramic material, or a brittle plastic material and may be formed in one piece in a molding, casting or machining process, or it may be fabricated by cementing or otherwise bonding the ring portions and the post portion together. With respect to the breakable post portion 33, its rupture characteristic is predictable by utilizing standards well within the knowledge of those skilled in the art without requiring the inventive faculty, taking into consideration the material used, its cross-sectional area and shape, for example. Although the element 23 has relatively sharp edges, the element may be formed to have generally curved edges.

In use, the loop 21 of the safety collar 11 in FIG. 1 may be placed about an animal's neck and the fixedly-held tether 39 attached to the closed ring 41. Here, tension on the tether will pull the second end portion 17 further through the first closed ring 19 so that the loop 21 becomes smaller and tightens around the animal. This is well known as a "choker" configuration. It can be seen that is highly desirable, when using a choke chain without immediate supervision by an attendant, that the loop not be allowed to tighten to the point where the animal may be harmed. Accordingly, the invention provides the breakaway element 23 which will separate the collar from the tether if a tension above a predetermined force is exceeded. If the element 23 is ruptured, it may easily be replaced by sliding the ring portions 25 and 27 from their associated split rings 35 and 41, and a new element 23 inserted therein.

Figure 2:
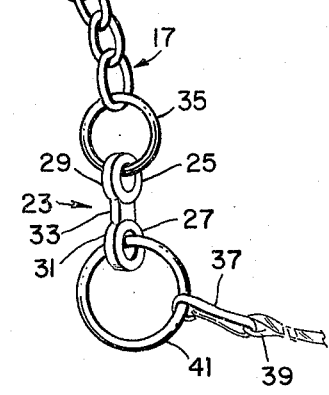
FIG. 2 is a partial perspective view of a safety collar constructed in accordance with another embodiment of the present invention.
Figure 3:
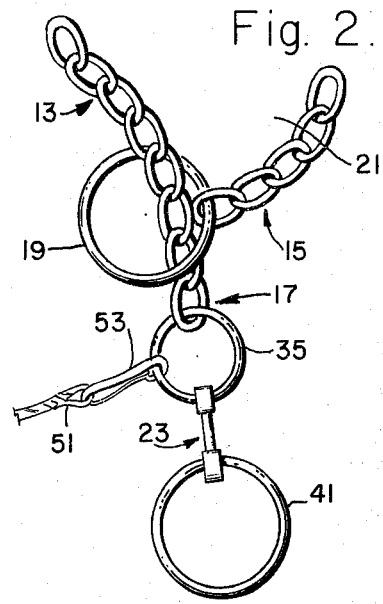
FIG. 3 is a perspective view of a portion of a safety collar, in accordance with a further embodiment of the present invention.

However, the safety collar of the invention may also be used in a conventional manner, that is without the safety feature, when a hand-held leash, for example, is attached to the collar. This embodiment is shown in FIG. 2, where a leash 51 is clipped by means of a release clip 53 to the closed ring 35, instead of ring 41. This effectively bypasses the breakaway element 23 when it is not needed to protect the restrained animal. Alternately, the release clip 53 may be attached to both the ring 19 and to the ring 35 in order to fix the dimension of the neck-encircling loop 21, and thereby defeat the "choke chain" effect, as illustrated in FIG. 3.

In order to provide a convenient means to have an animal carry a name or identity tag, etc., it is often desirable that the collar 11 remain about the animal's neck even though no tether or leash is to be attached to it. From FIGS. 1-3, it can be seen that the collar 11 cannot come apart because the ring 41 cannot pass through the ring 19. Thus, if the safety collar became entangled or otherwise fixedly held on an obstruction and enough tension applied to the breakaway element 23, the breakable post portion 33 would rupture and free the animal.

Figure 4:
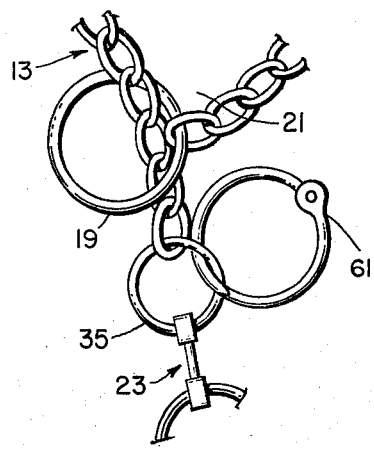
FIG. 4 is a partial perspective view of yet another embodiment of the present invention.
Figure 5:
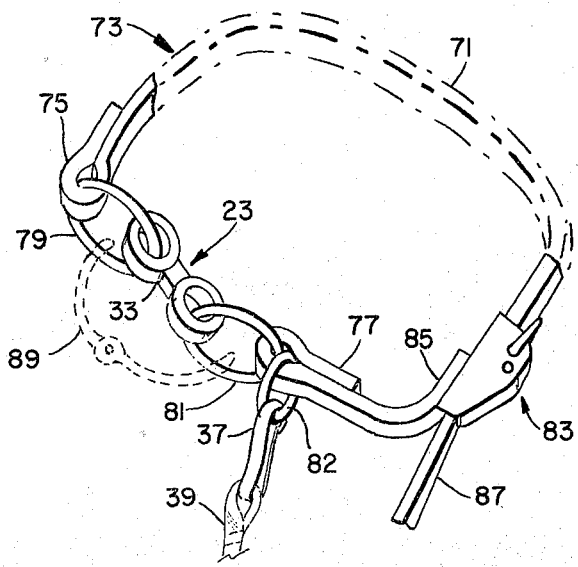
FIG. 5 is a perspective view of still a further embodiment of the invention.

In those instances where it is desired that no leash or tether is to be used and the safety feature temporarily not be utilized, a conventional snap ring 61 may be clipped on to the closed ring 35, as shown in FIG. 4.

Where a chain is too heavy or for any other reason not desired as the flexible neck member, a rope, cord, or belt-like flexible band member 71, as shown in an embodiment of a safety collar 73 of FIG. 5, may be utilized. The member 71 may be fabricated from any conventional material such as natural or synthetic fibers or solid plastic material, for example, and includes end loops 75 and 77 in which are preferably attached split rings 79 and 81, and a tether-attachment ring 82. The collar 73 also includes a conventional buckle 83 which adjustably couples together the ends 85 and 87 of the flexible band 71, and a breakable element 23 is attached to the closed rings 79 and 81 to provide a safety release feature if tension on the tether 39 exceeds the predetermined rupture point of the breakable post portion 33. Also, the safety release feature is operable even without the tether attached, as when the animal's collar snags a tree limb or a fence picket, and the like. When the safety release feature is temporarily not desired, a conventional snap ring 89 (shown partially by a dashed outline) may be clipped to both the closed rings 79 and 81, the ring 89 preventing tension in the band 71 from being exerted on the element 23.

From the foregoing, it should be evident that there has herein been described a new and improved safety collar for animals that is simple and inexpensive to manufacture but which is very dependable in operation and that does not change its characteristic with time or use.

It should be noted that although specific configurations and materials have been identified, these are not critical and other configurations and materials may be substituted therefor within the scope of the appended claims.

What is claimed is:

1. A safety collar for attachment about an animal's neck, comprising:

a flexible neck member adapted to encircle an animal's neck and having first and second end portions, said first end portion having a first closed ring attached thereto, said second end portion being adapted to extend through said first closed ring;

a second closed ring; and breakaway means including a pair of relatively small diameter closed ring portions coupled together at a point in their respective outer peripheral surfaces by a breakable connecting post portion, said breakaway means being attached between said second end portion and said second closed ring by said ring portions for releasing said second closed ring from said flexible neck member when tension in said breakable connecting post portion exceeding a predetermined magnitude ruptures said post portion.

2. The safety collar according to claim 1, wherein said breakaway means also includes a relatively smaller diameter third closed ring connecting together one of said ring portions and said second end portion of said flexible neck member, said third closed ring having an outer diameter less than the inner diameter of said first closed ring.

3. The safety collar according to claim 1 wherein said flexible neck member is a chain.

4. The safety collar according to claim 1, wherein the outer diameter of said second closed ring is greater than the inner diameter of said first closed ring.

5. The safety collar according to claim 4, wherein said second and third closed rings include means whereby they may be detached from said ring portion of said breakaway means.

6. A safety collar for attachment about an animal's neck, comprising:

a flexible neck member adapted to encircle an animal's neck and having first and second end portions, said first end portion having a first closed ring attached thereto and said second end portion having a second closed ring attached thereto;

buckle means disposed in said flexible neck member for releasably attaching said collar to an animal's neck; and breakaway means including a pair of relatively small diameter closed ring portions coupled together at a point in their respective outer peripheral surfaces by a breakable connecting post portion, said breakaway means being attached between said first and second closed rings for releasing said flexible neck member from about an animal's neck when tension in said breakable connecting post portion exceeding a predetermined magnitude ruptures said post portion.

7. The safety collar according to claim 6, wherein said flexible neck member is a flexible band.

8. For use with a flexible neck member adapted to encircle an animal's neck and having first and second ring portions at each end of said member and a teathering ring; a breakaway safety element comprising:
 a. a pair of closed ring portions mechanically rigidly coupled together in an integral structure by a breakable connecting post means including a post portion,
 b. said breakable post portion extending between the outer peripheral surfaces of said closed ring portions for releasing said closed ring portions when tensional forces exerted on said breakable post portion through said closed ring portions exceed a predetermined magnitude to rupture said breakable post portion,
 c. one of said closed ring portions being receivable over said first or second ring of said neck member and the other of said closed ring portion being receivable over said teathering ring.

* * * * *